United States Patent [19]

Wulff et al.

[11] Patent Number: 5,632,361
[45] Date of Patent: May 27, 1997

[54] VIBRATION DAMPER, IN PARTICULAR FOR MOTOR VEHICLES

[75] Inventors: Gunther Wulff, Schweinfurt; Achim Thomä, Bergrheinfeld; Günther Reusing; Stefan Irmscher, both of Niederwerrn; Wolfgang Herdeg, Höhenkirchen, all of Germany

[73] Assignee: Fichtel & Sachs AG, Schweinfurt, Germany

[21] Appl. No.: 527,852

[22] Filed: Sep. 14, 1995

[30] Foreign Application Priority Data

Sep. 16, 1994 [DE] Germany ............... 44 33 056.1

[51] Int. Cl.⁶ ............... F16F 6/00; F16F 9/14; F16F 9/53; B60G 13/00
[52] U.S. Cl. ............... 188/267; 188/322.22; 188/322.15; 267/140.14
[58] Field of Search ............... 188/267, 299, 188/322.5, 268, 322.22, 322.15, 281, 282, 316, 317, 320; 267/140.14, 140.15; 60/326; 192/21.5, 84 PM

[56] References Cited

U.S. PATENT DOCUMENTS

| | | |
|---|---|---|
| 4,679,775 | 7/1987 | Funaki et al. ............... 188/267 |
| 5,018,606 | 5/1991 | Carlson ............... 188/267 |
| 5,170,866 | 12/1992 | Ghaem . |
| 5,277,281 | 1/1994 | Carlson et al. . |
| 5,284,330 | 2/1994 | Carlson ............... 188/267 |

FOREIGN PATENT DOCUMENTS

| | | |
|---|---|---|
| 1094516 | 5/1955 | France . |
| 1414841 | 9/1965 | France . |
| 2579283 | 9/1986 | France . |
| 1813849 | 7/1970 | Germany . |
| 3434897 | 9/1985 | Germany . |
| 3631107 | 3/1988 | Germany . |
| 4204070 | 2/1993 | Germany . |
| 63-140141 | 6/1988 | Japan . |
| 1753092 | 8/1992 | U.S.S.R. . |
| 9400704 | 1/1994 | WIPO . |

*Primary Examiner*—Douglas C. Butler
*Attorney, Agent, or Firm*—Nils H. Ljungman and Associates

[57] ABSTRACT

Vibration damper, in particular for motor vehicles, including a work cylinder, a work piston fastened to a piston rod and dividing the work cylinder into two work chambers, possibly an equalization chamber and a piston rod guide which seals the piston rod against the atmosphere, whereby the work chambers are filled with a magnetorheological fluid to which an electric coil can be applied. In the event of a failure or malfunction of the electric coil, it must be possible to achieve a safe damping force, by having at least one permanent magnetic field which acts on the magnetorheological fluid.

20 Claims, 7 Drawing Sheets

5,632,361

VIBRATION DAMPER, IN PARTICULAR FOR MOTOR VEHICLES

BACKGROUND OF THE INVENTION

1. Field of the Invention

The present invention generally relates to a vibration damper, in particular for motor vehicles, such a vibration damper including a work cylinder, a work piston fastened to a piston rod and dividing the work cylinder into two work chambers, and possibly an equalization chamber and a piston rod guide which seals the piston rod against the atmosphere, whereby the work chambers are filled with a magnetorheological fluid which can be acted upon by an electric coil.

2. Background Information

Such known vibration dampers are disclosed, for example, in U.S. Pat. No. 5,277,281, in which the work chambers of the work cylinder are separated by a work piston and are filled with a magnetorheological fluid. The work piston thereby has flow passages through which the fluid flows and generates a corresponding damping force. Such a fluid essentially changes its viscosity when a magnetic field is applied to it, so that the damping force of the vibration damper is variable, i.e. it can be adjusted in a variable manner. The change of the viscosity is generated by an electric coil and a soft iron circuit and the related magnetic field strength. If no current flows through the coil, the magnetorheological fluid acts like a normal liquid with a relatively low viscosity. Only when a current is applied to it by the electric coil does the viscosity of the fluid increase in the magnetic field. One disadvantage, therefore, is that when a malfunction or defect occurs, e.g. a power failure or a break in a cable, the damping force of the vibration damper is relatively low, which behavior can be undesirable.

OBJECT OF THE INVENTION

An object of the present invention is to improve a vibration damper with a damping force which can be varied by means of a magnetorheological fluid, so that, in the event of a failure of the magnetic field acting on the fluid, the vibration damper can automatically provide a safe damping force.

SUMMARY OF THE INVENTION

The present invention teaches that the above object can be achieved, in accordance with at least one preferred embodiment, by applying at least one permanent magnetic field to the magnetorheological fluid.

One advantage of this solution is that, by the application of one or more permanent magnetic fields, an initial stress or prestress can be applied to the fluid, i.e. the permanent magnetic flux increases the viscosity of the magnetorheological fluid to a value which produces a damping force which ensures the safety of the motor vehicle.

In an additional embodiment, the invention teaches that at least one permanent magnet is provided as the permanent magnetic field.

In one favorable embodiment, the permanent magnetic field is compensated or reinforced by an additional magnetic field. In this case, the additional magnetic field can advantageously be varied by means of an electric coil. In this embodiment, it is advantageous that the magnetic field can be increased or decreased by the current applied by the coil, as a function of the current strength and polarity, so that the viscosity of the magnetorheological fluid can be increased or decreased. That results in a variably adjustable damping force of the vibration damper.

In an additional embodiment, the work piston is provided at least partly with flow channels. The flow channels can advantageously be designed as holes or as recesses.

In an additional favorable embodiment, the recesses are provided with a width which varies.

The work piston can also preferably be provided with grooves in its area adjacent to the flow channels. The grooves are thereby advantageously provided with a groove base, the depth of which varies.

It is thereby advantageous that the work piston is guided in a sealed manner with respect to the work cylinder, and that the magnetorheological fluid flows through the piston. On account of the particular shape of the flow channels, whereby the width of the recess changes over the circumference, and the depth of the groove base can also be varied over the circumference, a resistance for the magnetic flux is created, which reduces the induction in the flow channel (i.e. air gap). As a result of the interaction of the groove base and the groove width, an essentially constant induction can be achieved in the flow channel, considered over the circumference. It is also advantageous that the shear rate over the shape of the flow channel, and thus the achievable shear stress, is a function of the respective location of the flow channel, and thus there will be areas in which the fluid essentially no longer flows, but is more or less solidified. The boundary between the solid and liquid fluid can thereby be a function of the magnetic field applied and of the flow.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

In summary, one aspect of the invention resides broadly in a vibration damper for damping vibrations of a suspension of a motor vehicle, the vibration damper comprising: a cylinder; a first end apparatus and a second end apparatus, the cylinder being disposed between the first end apparatus and the second end apparatus; means, provided at the first end apparatus of the vibration damper, for connecting the vibration damper to the body of a motor vehicle; means, provided at the second end apparatus of the vibration damper, for connecting the vibration damper to the suspension of a motor vehicle; damping fluid disposed within the cylinder; a piston rod projecting into the cylinder, the piston rod being movable axially within the cylinder; means for sealing the piston rod with respect to the atmosphere; a piston disposed on the piston rod, the piston dividing the cylinder into a first chamber and a second chamber; means for providing fluid communication between the first chamber and the second chamber; the damping fluid comprising a magnetorheological fluid which increases in viscosity in response to the application of at least one magnetic field thereto; and means for providing at least one permanent magnetic field to the magnetorheological fluid at least in the means for providing fluid communication, to increase the viscosity of the magnetorheological fluid at least in the means for providing fluid communication.

BRIEF DESCRIPTION OF THE DRAWINGS

Preferred embodiments of the invention are illustrated schematically in the accompanying figures.

DESCRIPTION OF THE PREFERRED EMBODIMENT

Figure 1:
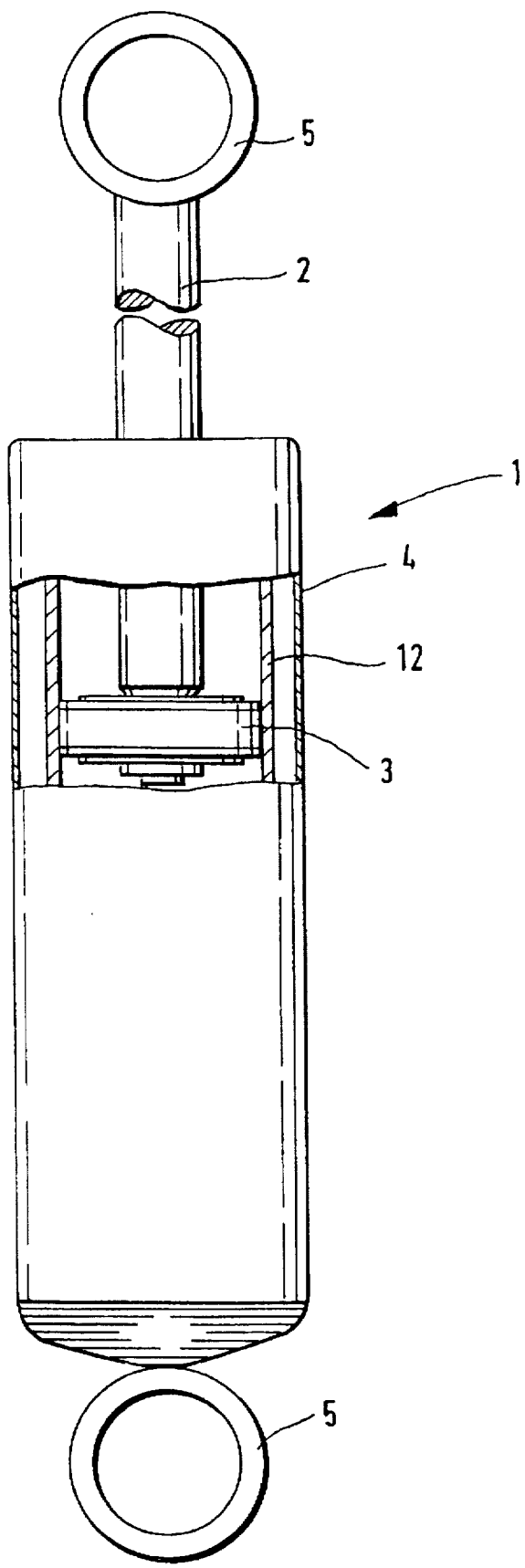
FIG. 1 shows a vibration damper in a plan view, in partial section.

The vibration damper 1 illustrated in FIG. 1 includes a work cylinder 12 and a work piston 3 which divides the work cylinder 12 into two work chambers, whereby the work piston 3 is guided outwardly by a piston rod 2. An external tube 4 and the piston rod 2 are provided with fastening parts 5. The illustrated vibration damper is a two-tube vibration damper, in which an equalization chamber is formed between the work cylinder 12 and the external tube 4. However, there are also embodiments which can be designed as single-tube vibration dampers, in which the equalization chamber inside the work cylinder 12 is located in its terminal area. Such single-tube vibration dampers will be well-known to those of ordinary skill in the art and will thus not be discussed in any further detail herein.

Figure 2:
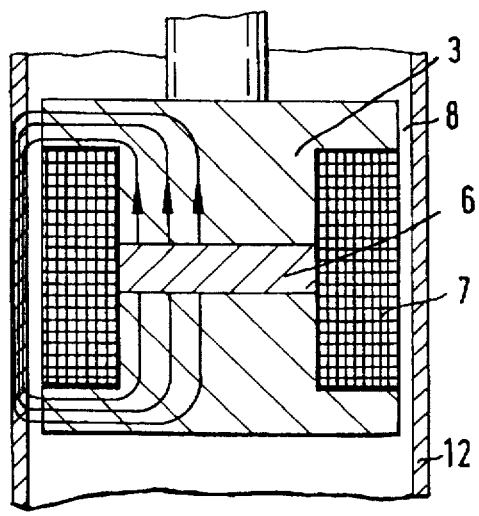
FIG. 2 shows a work piston of a vibration damper with a permanent magnet.

FIG. 2 shows a work piston 3 in detail, which has both a permanent magnet 6 and an electric coil 7 to generate corresponding magnetic fields. In this embodiment, the space between the work cylinder 12 and the outside circumference of the work piston 3 is used as flow channels 8. The magnetic flux is returned from the work piston 3 via the flow channels 8 and the work cylinder 12 to the work piston 3.

Thus, in accordance with a preferred embodiment of the present invention, as illustrated in FIG. 2, a permanent magnet 6 may be provided in conjunction with an electric coil 7 to generate magnetic fields for imparting increased viscosity to the magnetorheological fluid disposed within the work cylinder 12. Conceivably, it may be considered that the magnetorheological fluid will have a viscosity comprising two components, namely a constant component and a variable component. Accordingly, the permanent magnet 6 can be considered as providing a base, or constant component of the viscosity, while the coil 7 may be used to selectively impart a variable viscosity in addition to the base or constant viscosity provided by the permanent magnet 6.

In this respect, it will be appreciated that, in accordance with at least one preferred embodiment of the present invention, the permanent magnet field or fields provided can be thought of as imparting a "prestress" to the magnetorheological fluid, which "prestress" can essentially ensure a safe magnitude of damping, even in the absence of magnetic fields from coil 7.

Within the scope of the present invention, it is conceivable to utilize essentially any suitable medium for providing at least one permanent magnetic field, and not necessarily permanent magnets per so. With regard to permanent magnets themselves, the type selected, and its degree of permanent magnetization, can be tailored to the requirements of the vibration damper in question.

It will be appreciated that, in the embodiment shown in FIG. 2, the flow channels 8 for permitting fluid communication between work chambers of the cylinder 12, are embodied essentially by one or more clearances between the piston 3 and the interior walls of the cylinder 12.

Figure 3:
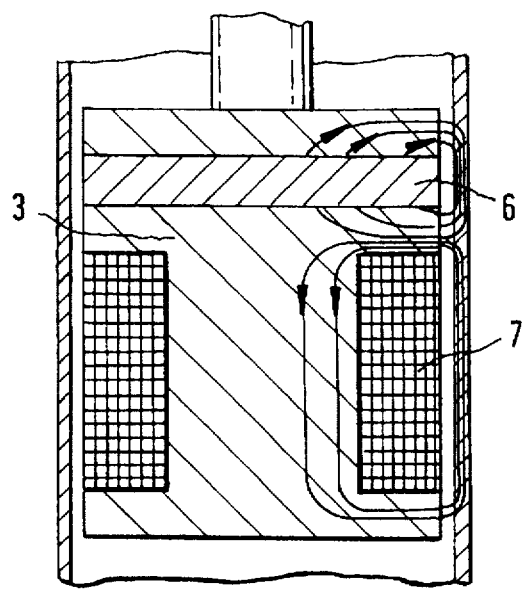
FIGS. 3 & 4 show additional embodiments of a work piston.

FIG. 3 illustrates an additional embodiment in which the work piston 3 is also provided with a permanent magnet 6, but in this case the electric coil 7 and the permanent magnet are located in the work piston 3 axially one behind the other, so that the permanent magnet generates one magnetic field and the electric coil 7 generates an additional magnetic field.

Figure 4:
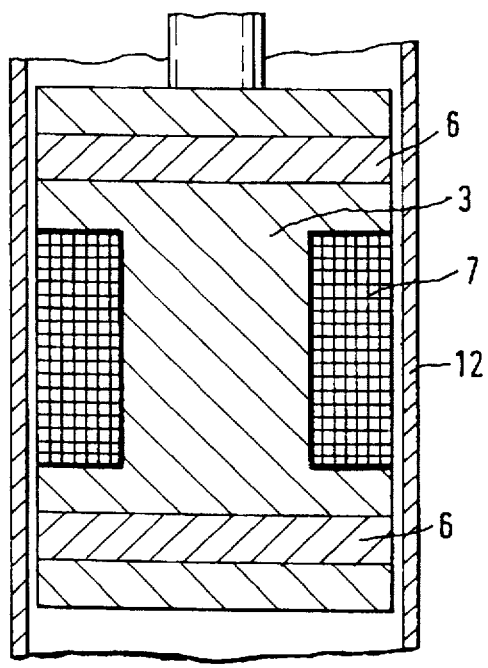

In contrast to the arrangement shown in FIG. 3, FIG. 4 illustrates a work piston 3 in which two permanent magnets 6 are attached, one at each end of the work piston 3, whereby the electric coil is located between the two permanent magnets. The magnetic flux again runs from the work piston 3 via the work cylinder 12 back to the work piston 3.

In FIGS. 2-4, guide elements are not illustrated. As will be appreciated by those of ordinary skill in the art, such guide elements, such as piston rod guides, would essentially ensure that the work piston 3 does not tilt, or become angularly disposed with respect to the interior walls of cylinder 12, during its movement in the work cylinder 12.

Figure 5:
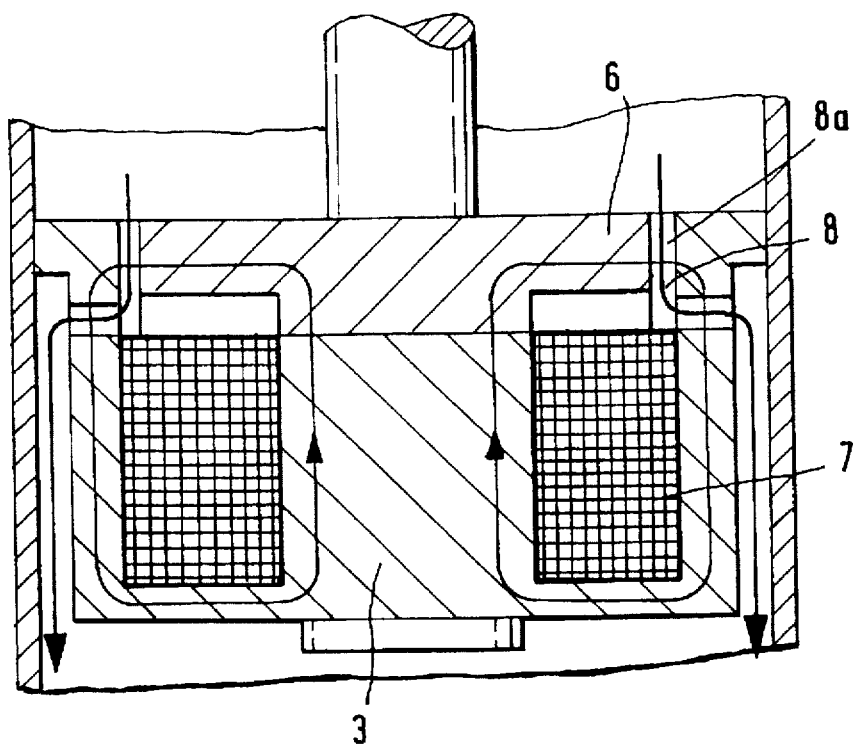
FIG. 5 shows a work piston with flow channels.

FIG. 5 illustrates an embodiment in which the electric coil 7 is also located in the work piston 3 and contains a permanent magnet 6 and a soft iron yoke which contains flow channels 8, so that once again two different magnetic fields can be generated. The flow channels 8 are thereby formed in the vicinity of the soft iron yoke as holes 8a.

Preferably, holes 8a may be of any suitable diameter, in any suitable number, and may preferably be uniformly distributed about the circumference of piston 3.

Figure 5A:
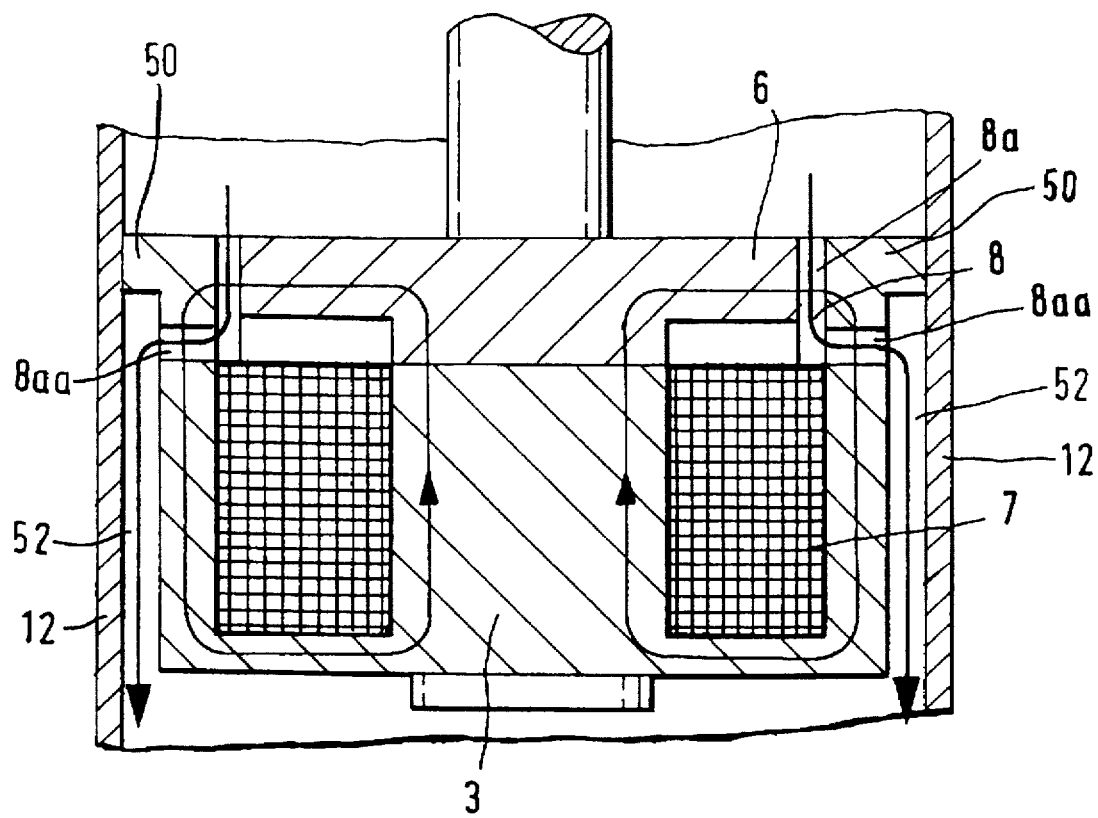
FIG. 5a is essentially the same view as FIG. 5, but more detailed.

FIG. 5a is essentially the same view as FIG. 5, but also indicates, at 50, a possible positioning of the aforementioned soft iron yoke, in accordance with at least one preferred embodiment of the present invention. Particularly, soft iron yoke 50 may preferably be embodied by an annular member which contacts the inner walls of cylinder 12 on one hand and coaxially surrounds permanent magnet 6 on the other hand. Further, an annular clearance 52 is preferably formed below that portion of soft iron yoke 50 that contacts cylinder Alternatively, the aforementioned soft iron yoke may conceivably take up the entire region assumed by the components in FIG. 5a indicated at 6 and 50, with one or more permanent magnets being placed in the vicinity of coil 7, possibly in an arrangement such as that shown in FIG. 2, or even in an arrangement such as that shown in FIGS. 3 or 4.

Conceivably, any suitable yoke may be utilized in accordance with the embodiments of the present invention, and may be positioned in any appropriate manner. In any case, the use of a magnetic yoke, such as a soft iron yoke, as a flux return arrangement, will be well-known to those of ordinary skill in the art, and will not be further discussed herein. As shown in FIG. 5a, outlet passages 8aa may preferably provided, in fluid communication with holes 8a, to permit fluid communication between holes 8a and clearance 52. Outlet passages 8aa may preferably be in the form of holes which intersect holes 8a essentially perpendicularly. Alternatively, there may be a continuous circumferential clearance instead of passages 8aa, having essentially the dimensions shown in FIG. 5a.

Figure 6:
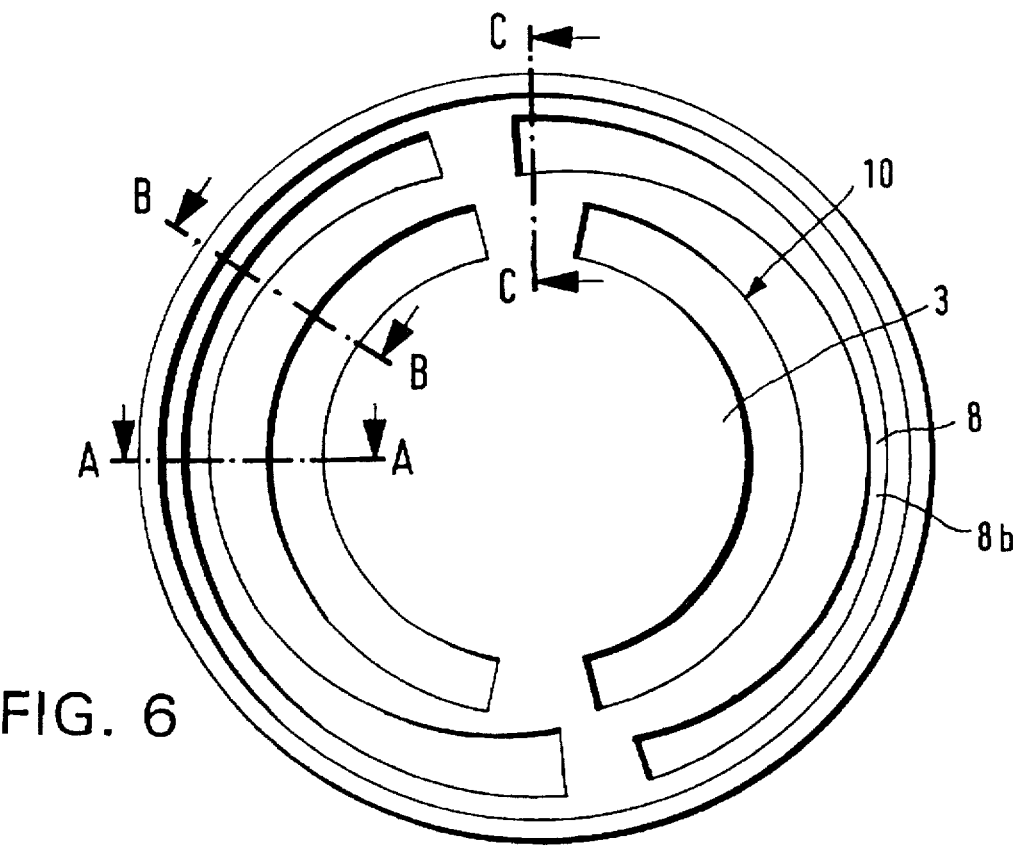
FIG. 6 shows an overhead view of a work piston of the general type illustrated in FIG. 5.

FIG. 6 shows the overhead view of the embodiment illustrated in FIG. 5 and 5a, in which the work piston 3 is provided with flow channels 8, but in this case the flow channels 8 are located as recesses or slots 8b which run over at least a portion of the circumference of the work piston 3.

In other words, the embodiment shown in FIG. 6 may be considered to be essentially the same as the embodiment shown in FIG. 5 and 5a but for the particular configuration of flow channels 8 and grooves 10, as described in more detail herebelow. In this respect, any discussion of basic components provided hereabove with respect to FIGS. 5 and 5a, such as the use of a magnetic return yoke, such as a soft iron yoke, is equally relevant here.

Figure 7:
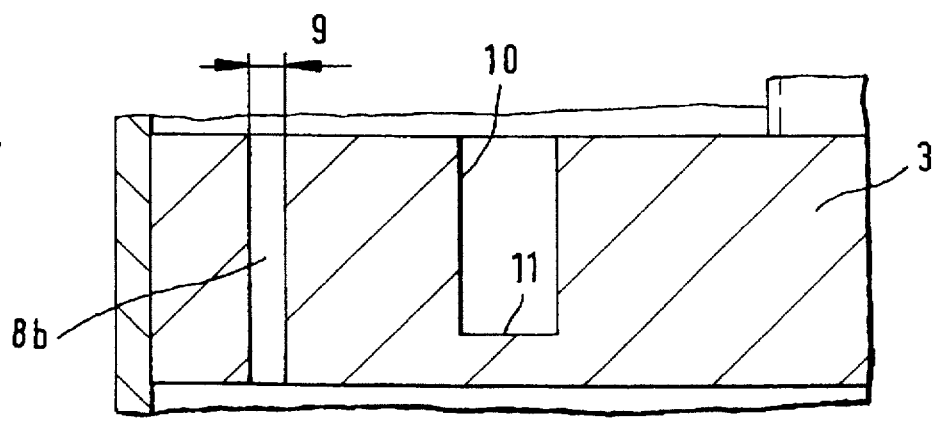
FIG. 7, 8, and 9 show various sections through the work piston illustrated in FIG. 6.
Figure 8:
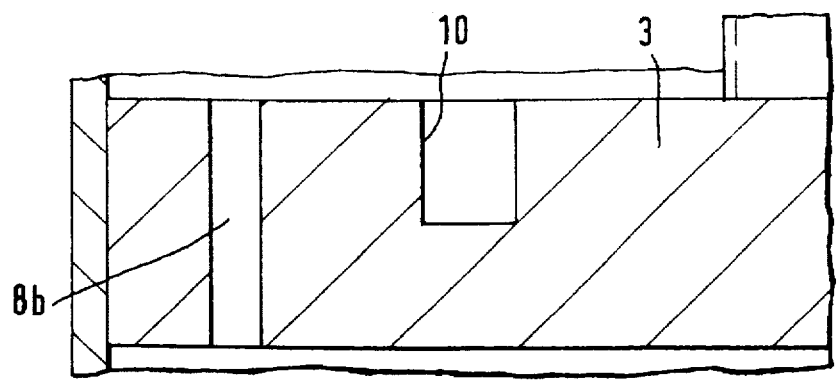
Figure 9:
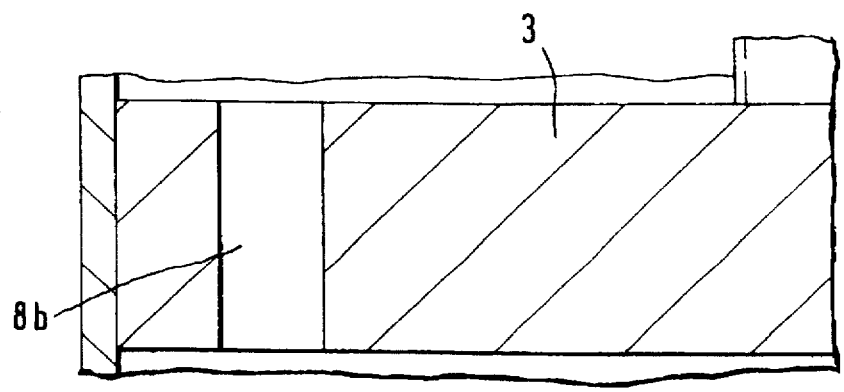
Figure 7A:
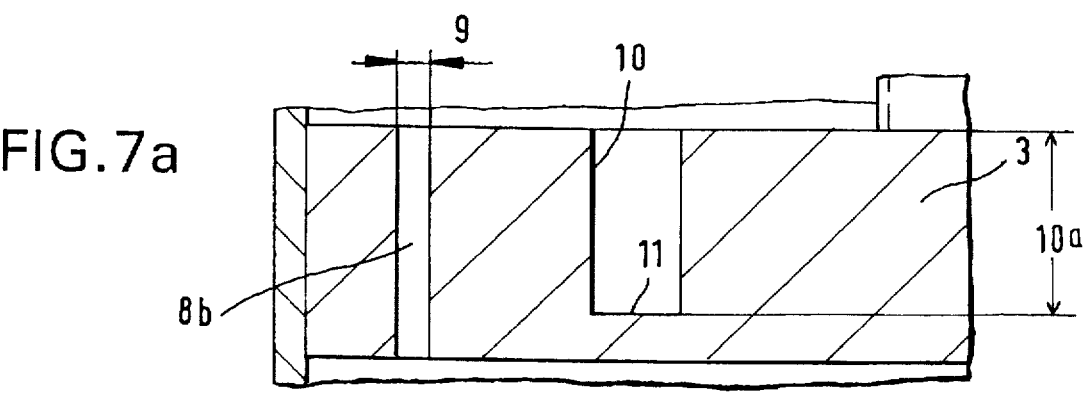
FIGS. 7a, 8a and 9a are, respectively, essentially the same views as FIGS. 7 to 9, but more detailed.
Figure 8A:
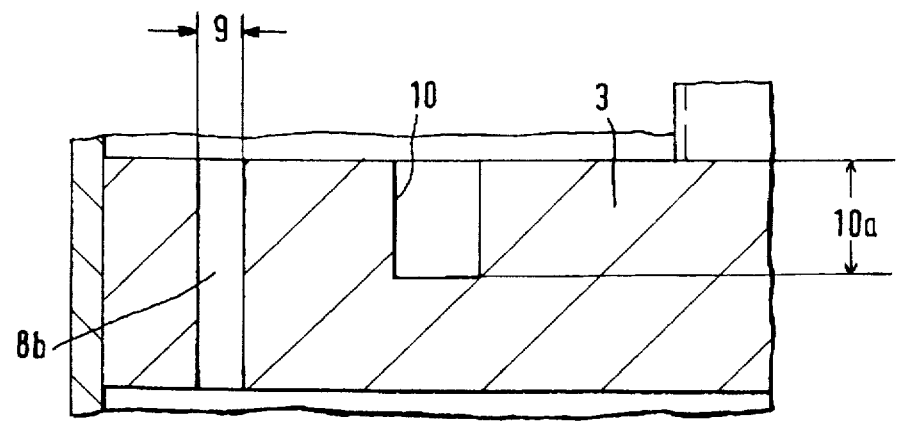
Figure 9A:
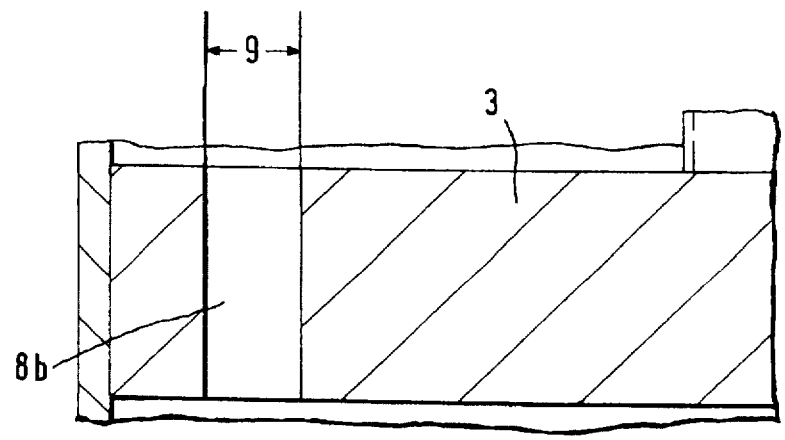

FIGS. 7 to 9 respectively illustrate the corresponding cutaways A—A, B—B and C—C as illustrated in FIG. 6, to show that the recesses/slots 8b distributed over the circumference can have a varying width 9 (see also FIGS. 8a and 9a). In addition, in an area generally adjacent to recesses/slots 8b, there can be a groove 10 with a groove base 11 of varying depth 10a (see FIGS. 7a and 8a). This shape of the flow channel 8, in which the width of the flow channel 8 (i.e. recess/slot 8b) varies over the circumference, and adjacent which a corresponding groove 10 may also be located, and essentially represent resistance for the magnetic flux, which resistance can consequently reduce the induction in the flow channels 8 (which flow channels 8 may be thought of as being analogous, in this context, to an air gap). As a result of the interaction of the width of the flow channel 8 and of the groove 10, an induction can be achieved in the flow channel 8 (i.e. the proverbial air gap) which is essentially constant over the circumference.

Accordingly, in accordance with at least one preferred embodiment of the present invention, as illustrated in FIGS. 6 through 9, it is conceivable to provide an arrangement in which circumferentially oriented recesses/slots 8b are provided for permitting throughflow of fluid through piston 3. Such recesses/slots may be provided in conjunction with grooves 10 that preferably do not permit throughflow of fluid through piston 3. On one hand, recesses/slots 8b may preferably have varying width along the circumference of piston 3, while, on the other hand, grooves 10 may preferably be of constant width yet varying depth, in order to collectively provide an arrangement in which essentially constant induction, with respect to the circumference of piston 3, can be ensured.

As illustrated in FIGS. 7–9 and 7a–9a, the above phenomenon may be ensured, for example, by rendering the width of recesses/slots 8b essentially inversely proportional to the depth of grooves 10. For example, as shown in FIGS. 9 and 9a, a portion of a recess/slot 8b having what may be considered maximal width can conceivably be juxtaposed with what may be termed a portion of a groove 10 having minimal or "zero" depth, i.e. no groove at all. Conversely, as shown in FIGS. 7 and 7a, a portion of a recess/slot 8b having minimal width may conceivably be juxtaposed with e portion of a groove 10 having a maximal depth. Consequently, the arrangement shown in FIGS. 8 and 8a may be considered to be intermediate to the arrangements shown in FIGS. 7 and 9.

The flow channels 8 are preferably not continuous, seen over the circumference. Alternatively, the flow channels 8 can be made continuous, in which case the area in which the flow channels are disposed can be made of a non-magnetic material, e.g. aluminum, to prevent a magnetic short circuit.

Whereas the embodiments discussed hereinabove each make use of an electric coil 7 in conjunction with an arrangement for providing at least one permanent magnetic field, it is, of course, conceivable to utilize an arrangement for providing at least one permanent magnetic field without the presence of an electric coil.

The disclosure now turns to a discussion of other shock absorber arrangements in which the present invention can conceivably be utilized. Particularly, FIG. 10 shows a conventional shook absorber arrangement and includes a bottom valve 207.

Accordingly, within the scope of the present invention, it is conceivable to utilize the arrangements discussed hereinabove, for providing at least one permanent magnet field, in conjunction with a bottom valve, a top valve, or side valve of a shook absorber. For example, it is conceivable to install one or more permanent magnets in the side valve of a shock absorber to provide at least one permanent magnet field, especially if the side valve provides damping in the shock absorber.

It will be understood that components discussed herebelow with relation to FIG. 10 may, if appropriate, be considered to be interchangeable with components discussed hereinabove with relation to FIGS. 1–9a. It will be understood that a composite piston arrangement, including magnet arrangements analogous to those described hereinabove, is schematically indicated in FIG. 10 at 1a.

Figure 10:
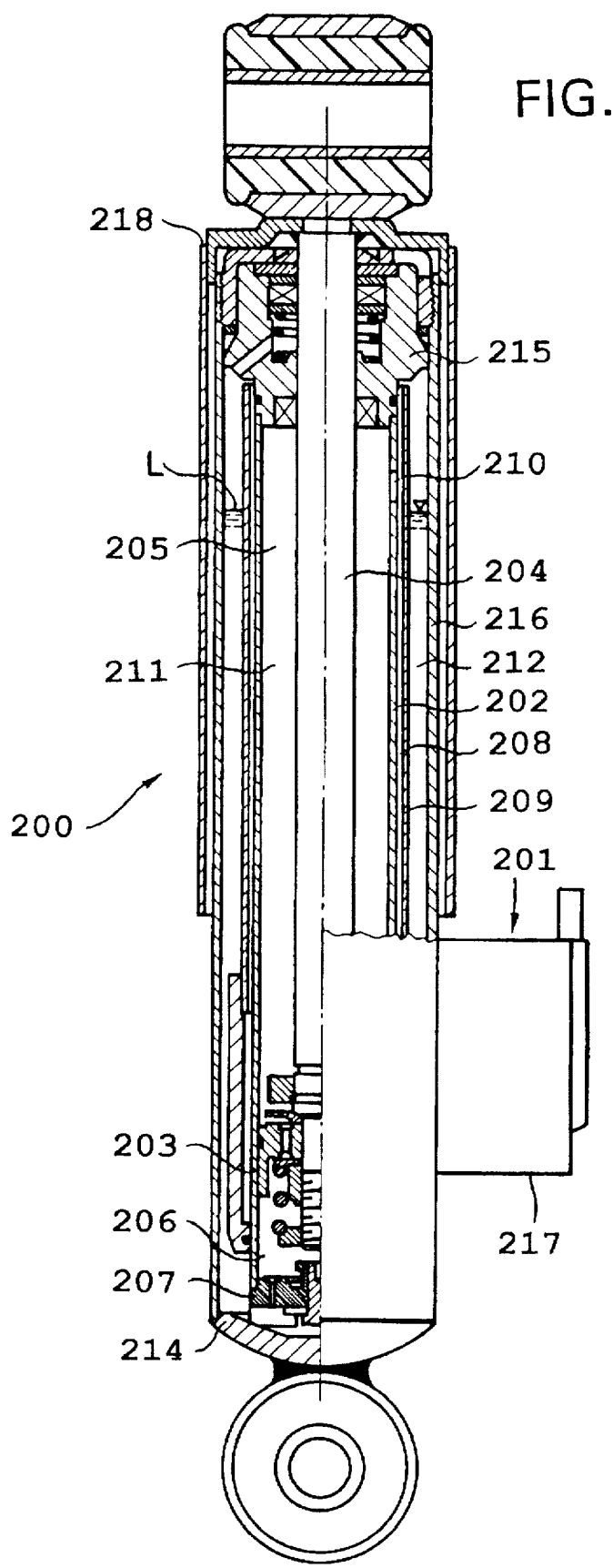
FIG. 10 illustrates a shock absorber having subsidiary components, including a bottom valve, with which the present invention could be employed.

FIG. 10 shows a complete shook absorber or oscillation damper 200, a detailed illustration of the valve unit 201 being omitted for the sake of clarity. The valve unit 201 can preferably be enclosed within a side tube 217, which side tube 217 can be welded to a container tube 216. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. Both the upper and the lower working chambers 211, 206 are preferably filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211. According to an illustrative example, the oscillation damper works as follows: When the piston rod 204 moves upwards, a high flow resistance occurs across the piston 203 and a high pressure is generated in the upper working chamber 211. Liquid from the upper working cheer 211 flows through said high flow resistance into the lower working chamber 206. As the piston rod 204 moves outward of the working space 205, the available volume within the working space 205 is increased. Therefore, liquid can flow from the compensating cheer 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working cheer 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists. On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force can be reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. As such, the damping force can again be reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can Be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

A cap for the vibration damper illustrated in FIG. 10 is indicated at 218. be understood that the piston arrangement 1a is shown schematically only for purposes of simplicity.

Conceivably, the embodiments of the present invention may also be employed in a mount configuration such as an engine also be employed in a mount configurations in which the present invention could conceivably be employed are disclosed, for example, in U.S. Pat. No. 5,277,281, which issued to Carlson et al. on Jan. 11, 1994.

One feature of the invention resides broadly in the vibration damper, in particular for motor vehicles, including a work cylinder, a work piston fastened to a piston rod and dividing the work cylinder into two work chambers, possibly an equalization chamber and a piston rod guide which seals the piston rod against the atmosphere, whereby the work chambers are filled with a magnetorheological fluid to which an electric coil can be applied, characterized by the fact that at least one permanent magnetic field can be applied to the magnetorheological fluid.

Another feature of the invention resides broadly in the vibration damper characterized by the fact that at least one permanent magnet 6 is provided as the permanent magnetic field.

Yet another feature of the invention resides broadly in the vibration damper characterized by the fact that the permanent magnetic field is compensated or reinforced by an additional magnetic field.

Still another feature of the invention resides broadly in the vibration damper characterized by the fact that the additional magnetic field can be varied by means of the electric coil 7.

A further feature of the invention resides broadly in the vibration damper characterized by the fact that the work piston 3 is provided at least partly with flow channels 8.

Another feature of the invention resides broadly in the vibration damper characterized by the fact that holes 8a are provided as the flow channel 8.

Yet another feature of the invention resides broadly in the vibration damper characterized by the fact that recesses 8b are provided as the flow channel 8.

Still another feature of the invention resides broadly in the vibration damper characterized by the fact that the recesses 8b are provided with a variable width 9.

A further feature of the invention resides broadly in the vibration damper characterized by the fact that the area adjacent to the flow channels 8 in the work piston 3 is provided with grooves 10.

Another feature of the invention resides broadly in the vibration damper characterized by the fact that the grooves 10 are provided with a groove base 11, the depth of which varies. Discussions of general phenomena and principles relating to magnetorheological fluids may be found in the following U.S. Pat. No. 5,277,281, which issued to Carlson et al. on Jan. 11, 1994; U.S. Pat. No. 5,284,330, which issued to Carlson et al. on Feb. 8, 1994; and U.S. Pat. No. 5,353,839, which issued to Kordonsky et al. on Oct. 11, 1994.

Discussions of general phenomena and principles relating to the use of magnetic yokes in magnetic flux return, may be found in the following U.S. Pat. No. 5,243,248, which issued on Sep. 7, 1993; U.S. Pat. No. 5,290,112, which issued to Stempfle et al. on Mar. 1, 1994; U.S. Pat. No. 5,298,827, which issued to Sugiyama on Mar. 29, 1994; U.S. Pat. No. 5,347,252, which issued to Riss on Sep. 13, 1994; and U.S. Pat. No. 5,363,078, which issued to Riss et al. on Nov. 8, 1994. Types of vibration dampers or shock absorbers, in which the embodiments of the present invention may be employed, or having components which may be utilized in accordance with the embodiments of the present invention, may be found in the following U.S. Pat. No. 4,723,640 to Beck on Feb. 9, 1988, entitled "Adjustably Hydraulic Vibration Damper"; U.S. Pat. No. 5,265,703 to Ackermann on Nov. 30, 1993, entitled "Adjustable Hydraulic Vibration Damper for Motor Vehicles"; U.S. Pat. No. 5,335,757 to Knecht et al. on Aug. 9, 1994, entitled "Hydraulic Adjustable Vibration Damper"; U.S. Pat. No. 5,078,240 to Ackermannn et al. on Jan. 7, 1992, entitled "Valve Body in Piston Having Directional Flow Control" and U.S. Pat. No. 4,635, 765 to Schmidt on Jan. 13, 1987, entitled "Adjustable Hydraulic Damper Apparatus"; U.S. Pat. No. 4,993,693 to L öhr et al. on Feb. 19, 1991, entitled "Self-pumping Hydropneumatic Shock Absorbing Leg With Internal Level Regulation"; U.S. Pat. No. 4,986,393 to Preukschat et al. on Jan. 22, 1991; U.S. Pat. No. 4,749,070 to Moser et al. on Jun. 7, 1988; and U.S. Pat. No. 4,723,640 to Beck on Feb. 9, 1988.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for damping vibrations of a suspension of a motor vehicle, said vibration damper comprising:

a cylinder;

a first end apparatus and a second end apparatus, said cylinder being disposed between said first end apparatus and said second end apparatus;

means, provided at said first end apparatus of said vibration damper, for connecting said vibration damper to the body of a motor vehicle;

means, provided at said second end apparatus of said vibration damper, for connecting said vibration damper to the suspension of a motor vehicle;

damping fluid disposed within said cylinder;

a piston rod projecting into said cylinder, said piston rod being movable axially within said cylinder;

means for sealing said piston rod with respect to the atmosphere;

a piston disposed on said piston rod, said piston dividing said cylinder into a first chamber and a second chamber;

means for providing fluid communication between said first chamber and said second chamber;

said damping fluid comprising a magnetorheological fluid increasing in viscosity in response to the application of at least one magnetic field thereto;

said means for providing fluid communication between said first chamber and said second chamber comprising at least one flow channel;

said at least one flow channel comprising:

a depth in the direction of flow of said damping fluid in said at least one flow channel;

a cross section, said cross section being substantially transverse to the direction of flow of said damping fluid;

said cross section comprising:

a first dimension; and a second dimension; and said first dimension of said cross section varies along said second dimension of said cross section; and means for providing at least one variable magnetic field to said magnetorheological fluid in said cross section to change the viscosity of said magnetorheological fluid in a selected portion of said cross section of said at least one flow channel.

2. The vibration damper as claimed in claim 1 wherein said first dimension of said cross section decreases and increases along said second dimension of said cross section.

3. The vibration damper as claimed in claim 2 wherein said means for applying at least one variable magnetic field to said magnetorheological fluid in said cross section to change the viscosity of said magnetorheological fluid in a selected portion of said cross section of said at least one flow channel comprises means for selectively changing the viscosity of said damping fluid in said selected portion of said cross section of said at least one flow channel.

4. The vibration damper as claimed in claim 3 wherein said means for selectively changing the viscosity of said damping fluid in said selected portion of said cross section of said at least one flow channel comprises means for increasing the viscosity of said damping fluid in said selected portion of said cross section to a viscosity greater than the viscosity in another portion of said cross section.

5. The vibration damper as claimed in claim 4 wherein said means for providing at least one variable magnetic field to said magnetorheological fluid in said selected portion of said cross section comprises at least one electromagnetic device.

6. The vibration damper as claimed in claim 5 wherein:

said means for applying a variable magnetic field to said magnetorheological fluid in said selected portion of said cross section comprises means for varying the magnetic flux of the variable magnetic field along said first dimension of said cross section of said at least one flow channel;

said magnetic flux varying means comprises at least one depression which is substantially aligned with said at least one flow channel;

said at least one depression has a depth substantially in the direction of flow of said damping fluid in said at least one flow channel; and said depth of said at least one depression varies along said first dimension of said cross section of said at least one flow channel.

7. The vibration damper as claimed in claim 6 comprising at least one permanent magnet for providing a magnetic field in said cross section.

8. The vibration damper as claimed in claim 7 wherein said at least one flow channel comprises at least one slot between said first chamber and said second chamber.

9. A vibration damper for damping vibrations of a suspension of a motor vehicle, said vibration damper comprising:

a cylinder;

a first end apparatus and a second end apparatus, said cylinder being disposed between said first end apparatus and said second end apparatus;

means, provided at said first end apparatus of said vibration damper, for connecting said vibration damper to the body of a motor vehicle;

means, provided at said second end apparatus of said vibration damper, for connecting said vibration damper to the suspension of a motor vehicle;

damping fluid disposed within said cylinder;

a piston rod projecting into said cylinder, said piston rod being movable axially within said cylinder;

means for sealing said piston rod with respect to the atmosphere;

a piston disposed on said piston rod, said piston dividing said cylinder into a first chamber and a second chamber;

means for providing fluid communication between said first chamber and said second chamber;

said damping fluid comprising a magnetorheological fluid which increases in viscosity in response to the application of at least one magnetic field thereto;

said means for providing fluid communication between said first chamber and said second chamber comprising at least one flow channel;

at least one groove;

said at least one groove having a depth generally in the direction of flow of said damping fluid in said at least one flow channel;

said at least one groove being disposed generally adjacent said at least one flow channel;

said depth of said at least one groove being variable over the length of said at least one groove; and means for providing at least one variable magnetic field to said magnetorheological fluid in a portion of said at least one flow channel to increase the viscosity of said magnetorheological fluid in said portion of said at least one flow channel.

10. The vibration damper as claimed in claim 9 wherein:

said at least one flow channel comprises:
- a depth in the direction of flow of said damping fluid in said at least one flow channel;
- a cross section;
- said cross section being substantially transverse to flow of said damping fluid;
- said cross section comprising:
  - a first dimension; and
  - a second dimension;
- said first dimension of said cross section varies along said second dimension of said cross section.

11. The vibration damper as claimed in claim 10 wherein said magnetic field providing means comprises:
- at least one electromagnetic device for providing at least one variable magnetic field to a selected portion of said cross section to change the viscosity of said damping fluid in said selected portion to a viscosity greater than the viscosity of another portion of said cross section; and
- at least one permanent magnet.

12. A vibration damper for damping vibrations of a suspension of a motor vehicle, said vibration damper comprising:
- a cylinder;
- a first end apparatus and a second end apparatus, said cylinder being disposed between said first end apparatus and said second end apparatus;
- means, provided at said first end apparatus of said vibration damper, for operatively connecting said vibration damper to the body of a motor vehicle;
- means, provided at said second end apparatus of said vibration damper, for operatively connecting said vibration damper to the suspension of a motor vehicle;
- damping fluid disposed within said cylinder;
- a piston rod projecting into said cylinder, said piston rod being movable axially within said cylinder;
- means for sealing said piston rod with respect to the atmosphere;
- a piston disposed on said piston rod, said piston dividing said cylinder into a first chamber and a second chamber;
- means for providing fluid communication between said first chamber and said second chamber;
- said damping fluid comprising a magnetorheological fluid which increases in viscosity in response to the application of at least one magnetic field thereto;
- said means for providing fluid communication between said first chamber and said second chamber comprising at least one flow channel;
- said at least one flow channel comprising:
  - a direction of flow;
  - a depth in said direction of flow of said damping fluid in said at least one flow channel;
  - a cross section, said cross section being substantially transverse to said direction of flow of said damping fluid;
  - said cross section comprising:
    - a first dimension; and
    - a second dimension;
- means for selectively changing the viscosity of said damping fluid in a selected portion of said cross section of said at least one flow channel; and
- said means for selectively changing the viscosity of a selected portion of said cross section of said at least one flow channel comprising means for providing at least one variable magnetic field to said selected portion of said cross section of said at least one flow channel to change the viscosity of said damping fluid in said selected portion of said cross section to a viscosity greater than the viscosity of another portion of said cross section.

13. The vibration damper as claimed in claim 12 wherein said means for providing at least one variable magnetic field to said selected portion of said cross section of said at least one flow channel to change the viscosity of said damping fluid in said selected portion of said cross section, comprises means for varying the magnetic flux of the variable magnetic field along said first dimension of said cross section of said at least one flow channel.

14. The vibration damper as claimed in claim 13 wherein said means for providing at least one variable magnetic field, to said selected portion of said cross section of said at least one flow channel to change the viscosity of said damping fluid in said selected portion of said cross section, comprises at least one electromagnetic device.

15. The vibration damper as claimed in claim 14 wherein said first dimension of said cross section of said at least one flow channel varies along said second dimension of said cross section of said at least one flow channel.

16. The vibration damper as claimed in claim 15 wherein said means for varying the magnetic flux of the variable magnetic field along said first dimension of said first dimension of said cross section of said at least one channel comprises at least one depression which is substantially aligned with said at least one flow channel.

17. The vibration damper as claimed in claim 16 wherein:
said at least one depression comprises at least one groove;
said at least one groove has a depth substantially in the direction of flow of said damping fluid in said at least one flow channel; and
said depth of said at least one groove varies along said first dimension of said cross section of said at least one flow channel.

18. The vibration damper as claimed in claim 17 comprising at least one permanent magnet for providing a constant magnetic field in said cross section.

19. The vibration damper as claimed in claim 18 wherein said at least one flow channel comprises at least one slot between said first chamber and said second chamber.

20. The vibration damper as claimed in claim 18 wherein said at least one flow channel comprises at least one hole between said first chamber and said second chamber.

* * * * *

UNITED STATES PATENT AND TRADEMARK OFFICE
CERTIFICATE OF CORRECTION

PATENT NO. : 5,632,361        Page 1 of 2
DATED : May 27, 1997
INVENTOR(S) : Gunther WULFF, Achim THOMÄ, Günther REUSING, Stefan IRMSCHER and Wolfgang HERDEG It is certified that error appears in the above-identified patent and that said Letters Patent is hereby corrected as shown below:

In column 4, line 9, after 'per', delete "so." and insert --se.--.

In column 4, line 55, after 'cylinder' insert --12.--.

In addition, in column 5, line 63, after 'with', delete "e" and insert --a--.

In column 6, line 66, after 'upper working', delete "cheer" and insert --chamber--.

In column 7, line 15, after 'working', delete "cheer" and insert --chamber--.

In column 7, line 64, after '218.' delete "be understood that the piston arrangement".

UNITED STATES PATENT AND TRADEMARK OFFICE
CERTIFICATE OF CORRECTION

PATENT NO. : 5,632,361
DATED : May 27, 1997
INVENTOR(S) : Gunther WULFF, Achim THOMÄ, Günther REUSING, Stefan IRMSCHER and Wolfgang HERDEG It is certified that error appears in the above-identified patent and that said Letters Patent is hereby corrected as shown below:

```
     In column 7, line 65, delete the entire line.

In column 8, line 1, after 'engine', delete "also
be employed in a" and insert --mount. Types of--.

In column 9, line 9, after 'to' delete "L".

In column 9, line 10, before 'et', delete "Ühr"
and insert --Lühr--.
```

Signed and Sealed this

Seventh Day of October, 1997

Attest:

BRUCE LEHMAN

*Attesting Officer*  *Commissioner of Patents and Trademarks*